(12) United States Patent
Li et al.

(10) Patent No.: US 11,368,213 B1
(45) Date of Patent: Jun. 21, 2022

(54) SYSTEM FOR DISTRIBUTED MANAGEMENT OF SATELLITE UPLINK COMMUNICATION

(71) Applicant: AMAZON TECHNOLOGIES, INC., Seattle, WA (US)

(72) Inventors: Baosheng Li, Kirkland, WA (US); Mohammad Mamunur Rashid, Redmond, WA (US); Bulin Zhang, Kirkland, WA (US); Ali Masoomzadeh, Bellevue, WA (US); Deepak, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/063,926

(22) Filed: Oct. 6, 2020

(51) Int. Cl.
| | | |
|---|---|---|
| *H04W 4/46* | (2018.01) | |
| *H04L 29/06* | (2006.01) | |
| *H04B 7/185* | (2006.01) | |
| *H04W 72/14* | (2009.01) | |
| *G06N 20/00* | (2019.01) | |
| *H04W 74/00* | (2009.01) | |
| *H04W 74/08* | (2009.01) | |
| *H04W 72/12* | (2009.01) | |

(52) U.S. Cl.
CPC ......... *H04B 7/18513* (2013.01); *G06N 20/00* (2019.01); *H04B 7/18519* (2013.01); *H04W 72/1289* (2013.01); *H04W 72/14* (2013.01); *H04W 74/006* (2013.01); *H04W 74/085* (2013.01)

(58) Field of Classification Search
CPC ....... H04L 41/022; H04L 43/10; H04L 43/12; H04L 43/50; H04L 67/42; H04W 24/06; H04W 48/18; H04W 88/06
USPC ...... 455/12.1, 522, 69; 370/324; 375/240.07
See application file for complete search history.

(56) References Cited

U.S. PATENT DOCUMENTS

| | | | | |
|---|---|---|---|---|
| 7,577,400 | B2 * | 8/2009 | Karabinis | .......... H04B 7/18563 |
| | | | | 455/12.1 |
| 10,194,269 | B2 * | 1/2019 | Venkataraman | ........ G01S 19/48 |
| 10,433,208 | B2 * | 10/2019 | Gopal | ................ H04B 7/18584 |
| 2007/0223414 | A1 * | 9/2007 | Mechaley | .......... H04B 7/18513 |
| | | | | 370/324 |
| 2010/0260259 | A1 * | 10/2010 | Kimmich | ............. H04N 21/631 |
| | | | | 375/240.07 |
| 2017/0279701 | A1 * | 9/2017 | Ahmadzadeh | ........ H04L 41/022 |
| 2017/0339710 | A1 * | 11/2017 | Johnson | ............. H04B 7/18595 |

(Continued)

*Primary Examiner* — Tan H Trinh
(74) *Attorney, Agent, or Firm* — Lindauer Law, PLLC

(57) ABSTRACT

A satellite provides communication between user terminals (UTs) and ground stations that connect to other networks, such as the Internet. Because the satellite is within range of many UTs at any given time, many UTs are in contention to use an uplink to send upstream data to the satellite. Contention for the uplink may be managed by sending grants that allocate a portion of the uplink time and frequency resources to individual UTs. A UT serviced by the satellite uses information based on the grants to determine whether upstream data from a user device connected the UT should be accepted for future transmission promised to deliver specified quality of service to the user device. Acting as a distributed system, each UT may decide to approve upstream data based on one or more factors, such as source address, destination address, header flags, predicted radio availability, and so forth.

20 Claims, 6 Drawing Sheets

(56) References Cited

U.S. PATENT DOCUMENTS

2019/0342000 A1\* 11/2019 Zheng .............. H04B 7/18517
2020/0028581 A1\* 1/2020 Gaske .............. H04B 7/18513
2020/0259250 A1\* 8/2020 Diamond ............ H01Q 3/08

\* cited by examiner

400

| COMMUNICATION RESOURCE DATA 170 ||
|---|---|
| PARAMETER 402 | VALUE 404 |
| GROUND STATION ID | CEDAR74 |
| TIMESLOT | 15011 |
| SATELLITE ID | 3941 |
| GS UPLINK MODEM | 4 |
| GS UPLINK TIMESLOT START | 2201 |
| GS UPLINK TIMESLOT END | 2220 |
| SAT DOWNLINK MODEM | 293 |
| GS DOWNLINK TIMESLOT START | 2205 |
| GS DOWNLINK TIMESLOT END | 2215 |
| SUBBEAM ID | 7 |
| ... | ... |

| GRANT DATA 166 ||
|---|---|
| PARAMETER 402 | VALUE 404 |
| UT IDENTIFIER | 568451 |
| SATELLITE ID | 3021 |
| UL/DL FREQUENCIES | 15.250 / 45.105 |
| TIMESLOT | 497 |
| GRANT EXPIRATION TIME | 2832 |
| ... | ... |

FIG. 4

| UPLINK DIGEST DATA 304 ||
|---|---|
| PARAMETER 502 | VALUE 504 |
| TIMESLOT | 497 |
| ACTUAL UPLINK THROUGHPUT (KBPS) | 70000 |
| ACTUAL UPLINK CAPACITY (KILOBITS) | 35000 |
| ACTUAL UPLINK % COMMITTED | 62 |
| ACTUAL UPLINK % UNCOMMITTED | 38 |
| MAX GRANTS UPLINK | 3500 |
| ACTUAL COUNT OF GRANTS ISSUED | 2170 |
| KILOBITS PER GRANT | 10 |
| ESTIMATED UPLINK THROUGHPUT | 63571 |
| ... | ... |

| UPLINK STATUS DATA 306 ||
|---|---|
| PARAMETER 502 | VALUE 504 |
| TIMESLOT | 497 |
| UPLINK THROUGHPUT (KBPS) | 70000 |
| UPLINK CAPACITY (KILOBITS) | 35000 |
| UPLINK % COMMITTED | 62 |
| UPLINK % UNCOMMITTED | 38 |
| MAX GRANTS UPLINK | 3500 |
| COUNT OF GRANTS ISSUED | 2170 |
| KILOBITS PER GRANT | 10 |
| ... | ... |

SYSTEM FOR DISTRIBUTED MANAGEMENT OF SATELLITE UPLINK COMMUNICATION

BACKGROUND

A satellite may provide communication service to many user terminals. These user terminals may be in contention with one another for use of an uplink to send data from individual user terminals to the satellite.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates communication resource data and grant data associated with operation of the system, according to some implementations.

FIG. 5 illustrates uplink digest data and uplink status data associated with operation of the system, according to some implementations.

Figure 1:
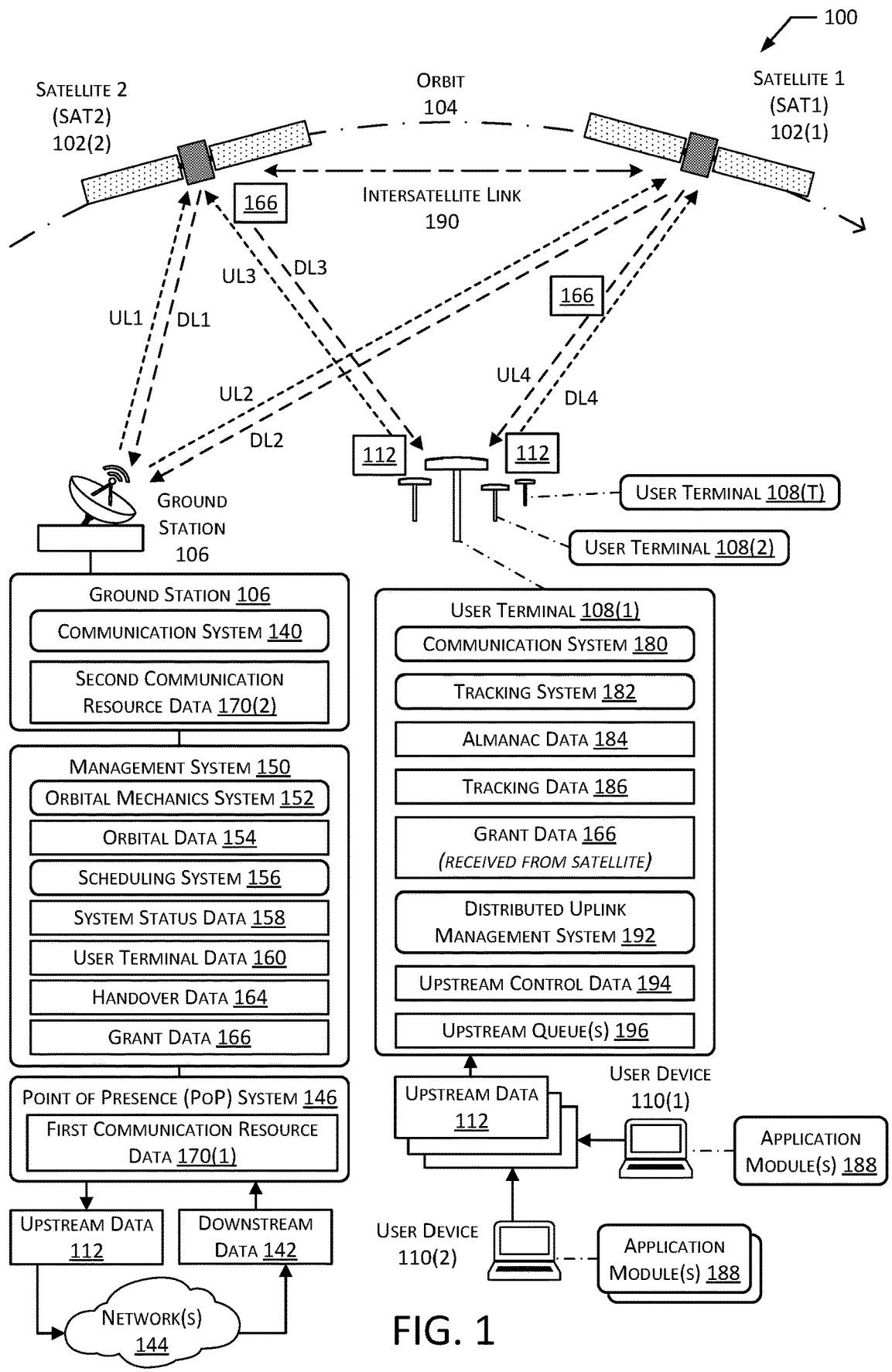
FIG. 1 illustrates a system that uses distributed uplink management by user terminals to manage contention for uplink resources, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large geographic coverage area of a given satellite, and a substantial number of user terminals served by each satellite, may result in an oversubscribed network that includes several congestion points that restrict the flow of network traffic. One congestion point is an uplink to the satellite, as many individual user terminals contend with each other to use the uplink to send data to the satellite.

The satellites provide communication services between devices, such as user terminals (UT) located on or near a body such as the Earth. For example, a first UT on a first geographic location (geolocation) on the Earth may send upstream data to a first satellite that is in range of the first UT. The first satellite may send the upstream data to a ground station, another satellite, and so forth. For example, the first satellite may send the upstream data to a ground station that in turn sends the upstream data to a point-of-presence (PoP). The PoP may then send the upstream data to a device on another network, such as a server on the Internet.

Likewise, downstream data destined for the first UT may be received at the PoP. The PoP sends the downstream data to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determines how long a satellite is within range of the UT is the orbital period of the satellite, that is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite. For example, as mentioned earlier, an individual satellite is only within communication range of a UT for a few minutes. Efficient management of the uplink becomes particularly important in this dynamic environment as poor management reduces throughput on the uplink. Reduced throughput may result in data being delayed, dropped, or other unacceptable outcomes.

Traditional techniques of managing an uplink are not intended for and so do not scale well to large numbers of UTs, particularly when those UTs are sending large quantities of data. For example, a sparse number of terminals in a conventional satellite system may each be assigned uplink resources in advance. However, this system is inflexible and results in unused capacity in the event a UT has no data to send. In another example, a sparse number of terminals making relatively short transmissions may attempt to use the uplink by transmitting at any time. However, this may result in the satellite receiving several overlapping signals, preventing successful decoding. The situation is further complicated by the variable nature of when upstream data is generated and sent to the UT. Some applications executing on a user device may generate traffic on a regular schedule, while others may be "bursty" in that a large amount of data is sent in rapid succession followed by a quiescent period. As a result, traditional techniques of managing an uplink are infeasible in a large satellite network that may involve thousands of satellites and millions of UTs.

Described in this disclosure is a distributed uplink management system in which individual UTs make individual determinations as to whether to approve upstream data to try and send to the satellite using the uplink. This determination is based on information that each UT acquires that is associated with operation of the uplink to the satellite. For example, the UT may receive grant data sent by the satellite. The grant data assigns communication resources such as time and frequency slots to other UTs. In another example, the satellite may send uplink digest data that is indicative of one or more of current or future usage of the uplink. Uplink status data is indicative of one or more of actual uplink resources that are in use currently, actual uplink resources that have been assigned for use in the future, an estimate of uplink resources that are expected to be used in the future, or other information. The uplink status data is used by the UT to determine whether upstream data is to be sent to the satellite or not.

The upstream data from a user device is received by the UT. For example, a user device may send a first packet of upstream data to the UT for transmission to the satellite. Based on one or more of the uplink status data or the upstream data, the UT determines whether to admit traffic from a user device for transmission on the uplink. For example, a header of the first packet may include data that indicates the first packet contains data associated with a quality of service (QoS) having a maximum delay of 100 ms, such as voice data.

In one implementation, if the UT determines, based on the uplink status data, that the uplink has capacity for the first packet to be sent within the 100 millisecond maximum delay, the UT may proceed to try and send the first packet to the satellite. In comparison, if the UT determines, based on the uplink status data, that the uplink is too busy to send the first packet within the 100 ms maximum delay, the UT may send to the user device a message indicating that transmission of the first packet has been denied. By having the UT make the determination as to whether to admit traffic or not to the uplink, overall performance is improved. For example, overall congestion on the uplink is improved by individual UTs backing off from trying to send upstream data. In another example, an application executing on the user device receives feedback more quickly, particularly in the case of a denial. This allows the application to take other applications-specific actions, such as discarding data, waiting and then retransmitting the data, and so forth.

By using the system and techniques described in this disclosure efficiency of a communication system using a satellite constellation is substantially improved. Uplink contention is reduced by using the distributed uplink management system at individual UTs to control attempts to use the uplink to conditions likely to result in data being successfully sent on the uplink. For example, attempts to use the uplink that are deemed likely to result in a failed request for a grant to use the uplink are prevented from being made. Responsiveness to user devices and the applications attempting to use the network to send upstream data is also improved. For example, instead of waiting for the propagation delay and processing delay associated with the UT sending a request to the satellite and then receiving a denial, the distributed uplink management system executing on the UT is able to quickly respond to the user device, allowing the user device more time to take mitigating actions.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules 188. For example, the application modules 188 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

One or more ground stations 106 are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network 144. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The resource scheduling system 1568 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use a crosslink 190 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The uplink to the satellite 102 may be managed by providing the grant data 166 to UTs 108. The grant data 166 is indicative of one or more parameters associated with uplink communication between the UT 108 and the satellite 102. For example, the grant data 166 may indicate the satellite identifier, uplink frequency, downlink frequency, assigned timeslot, signal encoding, and forth. The grant data 166 may be generated by the satellite 102, or in some implementations by the network management system 150. For example, the satellite 102(1) may receive uplink requests and responsive to those uplink requests send grant data 166.

The UT 108 includes a communication system 180 to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The user device 110 may execute one or more application modules 188. The data includes upstream data 112 sent by the user device 110 or downstream data 142 that is addressed to the UT 108 or the user device 110. For example, during operation the application module 188 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 190 provides for communication between satellites 102 in the constellation.

The UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

During operation of the UT 108, a distributed uplink management system 192 determines whether to approve upstream data 112 to send to the satellite 102 using the uplink or deny the upstream data 112. This determination is based at least in part on uplink status data. The uplink status data is determined based on information received from the satellite 102 and is indicative of one or more of actual uplink resources that are in use currently on the satellite 102, actual uplink resources of the first satellite 102 that have been assigned for use in the future, an estimate of uplink resources of the first satellite 102 that are expected to be used in the future, or other information. The uplink status data may be based on the grant data 166 received by the first UT 108 that is sent by the satellite 102 to a plurality of UTs 108 that are within range of the satellite 102. The uplink status data may be based on uplink digest data sent by the satellite 102 that is indicative of one or more of current or future usage of the uplink.

Based on the uplink status data and the upstream data 112, the distributed uplink management system 192 determines upstream control data 194. The upstream control data 194 is indicative of whether the UT 108 will attempt to send particular upstream data 112 to the satellite 102. For example, the upstream control data 194 may comprise a single bit value that is determined per-packet of upstream data 112. If the upstream control data 194 for a first packet is determined to be "0", the first packet may be denied. If the upstream control data 194 for a second packet is determined to be "1", UT 108 will attempt to send the second packet to the satellite 102. For example, if the upstream control data 194 indicates that upstream data 112 is to be sent, the allowed upstream data 112 may be placed into one or more upstream queues 196 for attempted transmission by the communication system 180. In other implementations, the upstream control data 194 may be indicative of a probability that the upstream data 112 is likely to be delivered within a specified interval of time. For example, the upstream control data 194 may indicate that data in the upstream queues 196 has a probability of 0.90 that it can be sent to the satellite 102 within the next two timeslots.

In some implementations, different upstream queues 196 may be maintained. For example, a first upstream queue 196 may be used for high priority traffic, while a second upstream queue 196 is used for low priority traffic. In another example, different upstream queues 196 may be allocated to particular application modules 188, destination addresses, classes of service, quality of service (QoS) data, and so forth. Responsive to upstream data 112 enqueued in the one or more upstream queues 196, the first UT 108(1) may send an uplink request to the satellite 102, requesting grant data 166 that allows use of the uplink. Operation of the distributed uplink management system 192 is discussed in more detail with regard to FIGS. 3-6.

By having each UT 108 make a determination as to whether to approve or deny upstream data 112 for attempted sending using the uplink, overall performance is improved. For example, overall congestion on the uplink is improved by individual UTs 108 backing off from trying to send upstream data 112 in the event the uplink is already at capacity. In another example, the application module 188 executing on the user device 110 receives feedback more quickly, particularly in the case of a denial. This allows the application module 188 to take other applications-specific actions, such as discarding data, waiting and then retransmitting the data, and so forth.

The system 100 may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

The PoP system 146 may determine the UT 108 that the downstream data 142 is addressed to and determines first communication resource data 170(1). The first communication resource data 170(1) specifies the communication resources, such as ground station 106, uplink modem at the ground station 106, satellite, downlink modem on the satellite, and so forth that would result in delivery of the downstream data 142 to the UT 108. The downstream data 142 may comprise a single packet or other unit of data transfer, or a plurality of packets or other units of data transfer that are associated with delivery to the particular UT 108.

In some situations, the communication resources specified in the first communication resource data 170(1) may no longer be suitable for sending the downstream data 142 to the UT 108. The first ground station 106(1) may determine second communication resource data 170(2) based on changed conditions. For example, the second communication resource data 170(2) may specify the use of a different uplink modem, compared to the first communication resource data 170(1), for transmission to the satellite 102.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
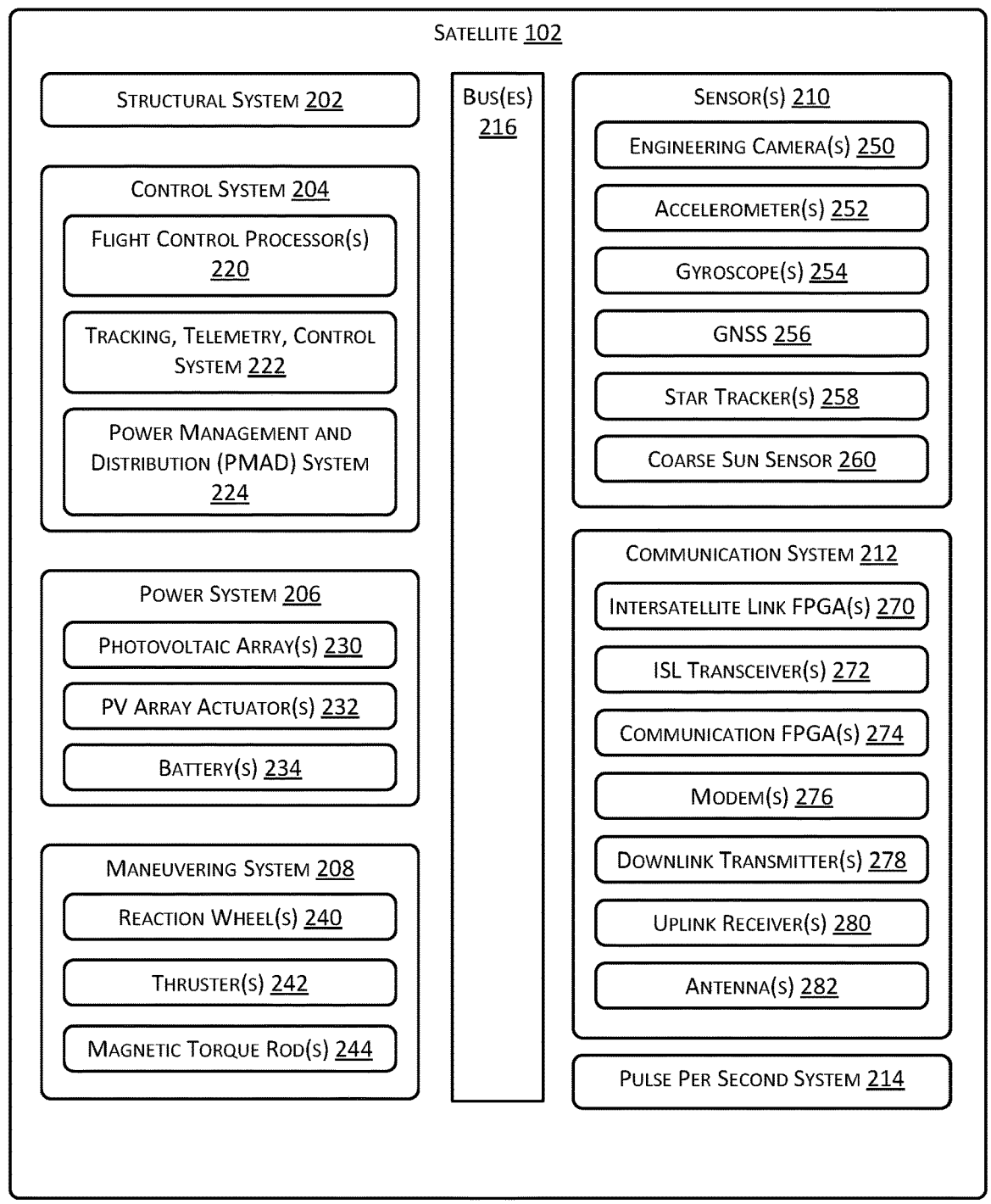
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may determine grant data 166 that specifies uplink resources for a UT 108 to communicate with the satellite 102. For example, the communication FPGA 274 may process a grant request that is received from a UT 108 by the uplink receiver 280. Responsive to the grant request, and subject to the availability of communication resources associate with the uplink, the communications FPGA 274 may determine grant data 166 that is then sent using the downlink transmitter 278.

Figure 3:
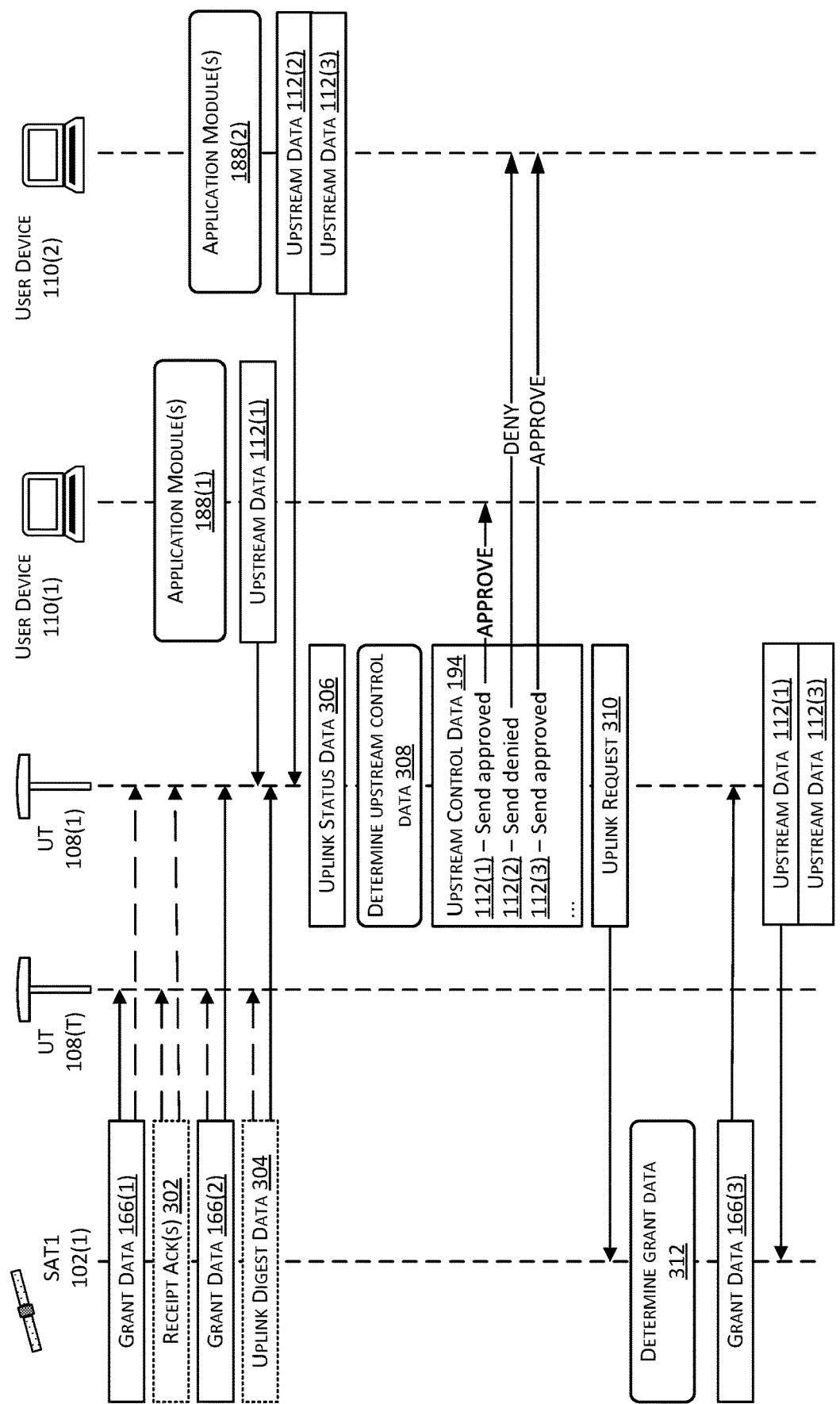
FIG. 3 illustrates a process of distributed uplink management by individual user terminals that is based on information about uplink usage received by those individual user terminals, according to some implementations.

FIG. 3 illustrates a process of distributed uplink management by individual user terminals 108 that is based on information about uplink usage received by those individual user terminals 108, according to some implementations. In this illustration, time generally increases from top to bottom. For example, an operation depicted at the top of the page may occur before an operation depicted at the bottom of the page.

In this illustration, the first satellite 102(1), the first UT 108(1), other UT(s) 108(T), a first user device 110(1), and a second user device 110(2) are shown. Other elements of the system 100 are omitted from this illustration for clarity, and not as a limitation.

Each satellite 102 may provide communication services to a plurality of UTs 108 that are within range. The plurality of UTs 108 includes the first UT 108(1), a second UT 108(2), . . . , 108(T). The satellite 102 may manage the uplink by providing the grant data 166 to particular UTs 108. For example, a UT 108 may send an uplink request to the first satellite 102(1) (not shown in this figure) requesting allocation of uplink resources, such as a timeslot to send upstream data 112. The first satellite 102(1) may assess the request and generate grant data 166 that is indicative of the communication resources associated with the uplink that are allocated for use by the requesting UT 108. Upon receiving the grant data 166, the UT 108 associated with that grant data 166 may use the allocated uplink resources to send upstream data 112.

The first set of UTs 108, including the first UT 108(1) are within communication range of the first satellite 102(1). As a result, each UT 108(T) may receive the grant data 166 that is being sent by the first satellite 102(1). For example, while the grant data 166(1) is addressed to the UT 108(T), the first UT 108(1) also receives the grant data 166(1) and may use this information as described below. Similarly, grant data 166(2) addressed to the first UT 108(1) may also be received by the other UTs 108(T) in the first plurality of UTs 108.

The satellite 102(1) may also send other data associated with operation of the uplink that may be received by the plurality of UTs 108 that are within range. In one implementation, during use of the uplink the satellite 102 may respond with a receipt acknowledgement ("receipt ack") 302 that is indicative of at least a portion of the upstream data 112 sent by a UT 108 in the plurality of UTs 108 having been successfully received by the satellite 102. For example, a receipt ack 302 may be transmitted for each packet or set of packets that are successfully received. In another implementation the satellite 102 may send the uplink digest data 304. The uplink digest data 304 may comprise information that is indicative of one or more of current or future usage of the uplink. The uplink digest data 304 is discussed in more detail with regard to FIG. 5.

In this illustration, the first UT 108(1) is in communication with two user devices 110(1) and 110(2). For example, the first UT 108(1) may have a local area network interface that is connected to a local area network 144. The user devices 110(1) and 110(2) may in turn be connected to the local area network 144. In some implementations the local area network 144 may be a wireless local area network. Each user device 110 executes one or more application modules 188. During operation the application module 188 may send upstream data 112, receive downstream data 142, or both send upstream data 112 and receive downstream data 142.

As shown here, the first user device 110(1) has a first application module 188(1) that sends upstream data 112(1) to the first UT 108(1). For example, the upstream data 112(1) may be addressed to a first server that is accessible via the network 144. The second user device 110(2) has a second application module 188(2) that sends upstream data 112(2) and upstream data 112(3) to the first UT 108(1). Continuing the example, the upstream data 112(2) may be addressed to a second server while the upstream data 112(3) is addressed to a third server, with the second and third servers being accessible via the network 144.

The first UT 108(1) has now received the upstream data 112(1)-(3). The first UT 108(1) has been receiving the information from the satellite 102(1) that is indicative of operation of the uplink. For example, the first UT 108(1) has been receiving the grant data 166, receipt acks 302, uplink digest data 304, and so forth.

The first UT 108(1) may determine uplink status data 306 that is indicative of one or more of actual uplink resources that are in use currently on the first satellite 102(1), actual uplink resources of the first satellite 102(1) that have been assigned for use in the future, an estimate of uplink resources of the first satellite 102(1) that are expected to be used in the future, or other information.

In some implementations the first UT 108(1) may determine the uplink status data 306 for additional satellites 102 that are within range. For example, the first UT 108(1) may be within range of four satellites 102(1)-(4). The distributed uplink management system 192 of the first UT 108(1) may maintain uplink status data 306 for these satellites 102 for use in determining a particular uplink associated with a particular satellite 102 to use for sending upstream data 112.

At 308 the distributed uplink management system 192 of the first UT 108(1) determines the upstream control data 194, based at least in part on one or more of the uplink status data 306 or the upstream data 112 that has been received. This determination is discussed in more detail with regard to FIG. 6.

The upstream data 112 may comprise one or more units, such as packets. The upstream control data 194 may be determined for individual packets, or groups of packets. For example, the upstream control data 194 shown in this figure indicates that upstream data 112(1) and 112(3) has been approved for sending, while upstream data 112(2) has been denied. The approved upstream data 112 may be stored in one or more upstream queues 196 (not shown). The communication system 180 may send the enqueued data stored in the upstream queues 196.

Information indicative of whether the upstream data 112 has been approved or denied may be provided by the UT 108 to the device that sent the upstream data 112. For example, data indicative of approval of the upstream data 112(1) and 112(3) may be sent to the first user device 110(2) while data indicative of denial of the upstream data 112(2) may be sent to the second user device 112(1).

The first UT 108(1), with approved upstream data 112 enqueued within the upstream queue 196, sends an uplink request 310 to the first satellite 102(1).

At 312, the first satellite 102(1) receives the uplink request 310 and determines grant data 166(3) indicative of uplink resources that are allocated for the first UT 108(1) to use. The grant data 166(3) is sent to the first UT 108(1).

After receiving the grant data 166(3), the first UT 108(1) uses the uplink resources allocated by the grant data 166(3) to send the upstream data 112(1) and 112(3) that is waiting in the upstream queue(s) 196.

FIG. 4 illustrates communication resource data 170 and grant data 166 associated with operation of the system 100, according to some implementations. The data may include a parameter 402 and an associated value 404.

The communication resource data 170 is representative of one or more communication resources associated with delivering the downstream data 142 to the UT 108. For example, the communication resource data 170 may be indicative of a ground station identifier, timeslot, a satellite identifier, one or more ground station to satellite uplink resources, one or more satellite to ground station downlink resources, or other data. The ground station identifier is indicative of the next ground station 106 that has been determined to handle the associated downstream data 142. The timeslot indicates the timeslot associated with the downstream data 142, such as determined by the PoP system 146. The satellite identifier indicates the satellite 102 that has been determined to handle the associated downstream data 142.

The ground station to satellite uplink resources may include a ground station uplink modem assignment, ground station uplink timeslot start, ground station uplink timeslot end, and so forth. The satellite to ground station downlink resources may include a satellite downlink modem assignment, ground station downlink timeslot start, ground station downlink timeslot end, subbeam identifier indicative of a particular subbeam, and so forth.

The communication resource data 170 may comprise additional information as well. This additional information may be determined by one or more of the PoP system 146, the management system 150, the ground station 106, the satellite 102, and so forth. For example, an intersatellite link (ISL) ID may specify another satellite 102 that may provide communication services to the UT 108 associated with the downstream data 142. Continuing the example, if the satellite 102 is unable to complete delivery to the UT 108 before the end of a target delivery window, the downstream data 142 may be sent to a second satellite 102(2) specified by the ISL satellite ID. The second satellite 102(2) may then attempt to deliver the downstream data 142.

The grant data 166 is indicative of one or more parameters 402 and corresponding values 404 associated with uplink communication from the UT 108 to the satellite 102. The grant data 166 may be determined by the satellite 102. For example, grant data 166 may be assigned by the satellite 102 responsive to an uplink request 310. In another example, grant data 166 may be determined based on data previously sent by the system 100. For example, based on previously received upstream data 112, the satellite 102 may send grant data 166 before receiving an uplink request 310.

The grant data 166 may include the parameters 402 and corresponding values 404 for the UT identifier, satellite identifier, uplink frequencies, downlink frequencies, timeslot(s), grant expiration time, encoding scheme, and so forth. For example, the UT identifier indicates the UT 108 that the grant data 166 is addressed to. The satellite identifier may indicate the satellite 102 that will be receiving the uplink. In some implementations the grant data 166 may designate another satellite 102 for use. The uplink frequencies may specify the transmit frequencies associated with the uplink. The downlink frequencies may specify the receive frequencies for traffic from the satellite 102. The timeslot may indicate a particular timeslot indicating a particular interval of time that is to be used for sending data on the uplink.

The grant data 166 may include a grant expiration time. For example, if no signal is received from the UT 108 within the threshold period of time after the timeslot begins, the first satellite 102(1) may deallocate the communication resources previously allocated for use by the UT 108. This deallocation may free up communication resources to be used for other UTs 108. For example, a modem onboard the first satellite 102(1) may be deallocated and allocated to provide an uplink to another UT 108.

In some implementations, the grant data 166 may include other information, such as a total number of bits permitted to be sent on the uplink, maximum amount of time that the uplink may be used, and so forth.

The grant data 166 sent by the satellite 102 provides information as to what the uplink status currently is or will be. For example, if the satellite 102 issues the grant data 166 on an ongoing basis for immediate use, the grant data 166 is indicative of current status on the uplink. In comparison, if the grant data 166 is for a future interval of time, such as specified by a particular timeslot, the grant data 166 is indicative of a future status of the uplink.

The distributed uplink management system 192 may use the grant data 166 that is addressed other UTs 108 in a plurality of UTs 108 to determine uplink status data 306 that is then used to determine whether to approve or deny upstream data 112. For example, if the grant data 166 indicates that more than 90% of the uplink capacity in an upcoming timeslot of the uplink has been allocated, the distributed uplink management system 192 may deny upstream data 112.

FIG. 5 illustrates uplink digest data 304 and uplink status data 306 associated with operation of the system 100, according to some implementations. The data may include a parameter 502 and an associated value 504.

In some implementations, the satellite 102 may send uplink digest data 304 to a plurality of UTs 108 that are in range. For example, the satellite 102 may broadcast the uplink digest data 304. The uplink digest data 304 may comprise information that is indicative of one or more of current or future usage of the uplink. For example, while determining the grant data 166, the satellite 102 may also determine the uplink digest data 304. In some implementations, the uplink digest data 304 may be transmitted before grant data 166 is transmitted. By sending the uplink digest data 304 before the grant data 166, the distributed uplink management systems 192 in the receiving UTs 108 may be provided with additional time to determine upstream control data 194.

The uplink digest data 304 may comprise one or more parameters 502 and their associated values 504. The parameters 502 may be indicative of actual or estimated values 504. The actual values 504 may be based on grant data 166 that has been determined. For example, the uplink digest data 304 may be indicative of a timeslot for which the uplink digest data 304 is associated, actual uplink throughput, actual uplink capacity, actual uplink percent committed, actual uplink percent uncommitted, maximum grants associated with the uplink, actual count of grants issued, data size per grant, and so forth.

The uplink throughput may be indicative of a data transfer rate per unit time, such as kilobits per second of the uplink. The uplink capacity may be indicative of a quantity of data that the uplink is able to transfer, such as during a particular timeslot. For example, the uplink capacity may be specified in kilobits. The uplink percent committed may be indicative of a percentage of uplink capacity that is allocated for use. The uplink percent uncommitted may be indicative of a percentage of uplink capacity that is not allocated and is otherwise available for use. The count of grants issued may be indicative of the number of individual grants, as indicated by grant data 166, that are associated with a particular timeslot. The data size per grant may indicate the number of bits that are associated with each grant. For example, the grant data 166 may allocate grants, with each grant corresponding to transfer of 10 kilobits using the uplink.

The estimated values 504 may be based on historical data, predictions, a subset of actual values, and so forth. For example the uplink digest data 304 may be indicative of the timeslot for which the uplink digest data 304 is associated, estimated uplink throughput, estimated uplink capacity, estimated uplink percent committed, estimated uplink percent uncommitted, maximum grants associated with the uplink, estimated count of grants issued, data size per grant, and so forth.

The distributed uplink management system 192 may determine uplink status data 306. The uplink status data 306 may comprise one or more parameters 502 and their associated values 504 that are indicative of one or more of actual uplink resources that are in use currently on the first satellite 102(1), actual uplink resources of the first satellite 102(1) that have been assigned for use in the future, an estimate of uplink resources of the first satellite 102(1) that are expected to be used in the future, or other information.

The uplink status data 306 may be indicative of a timeslot for which the uplink status has been determined, uplink throughput, uplink capacity, uplink percent committed, uplink percent uncommitted, maximum grants associated with the uplink, count of grants issued, data size per grant, and so forth. The uplink status data 306 may be maintained as an ongoing aggregated value. For example, as grant data 166 is received the values may be added to the uplink status data 306, while grant data 166 that has expired may be removed. In another implementation, the receipt acks 302 may be used to update the uplink status data 306. For example, grant data 166 may be associated with receipt acks 302 by matching UT identifiers. The receipt acks 302 may be used to offset or remove grant data 166 from consideration in determining the uplink status data 306.

In other implementations other techniques may be used to determine the uplink status data 306. For example, the uplink status data 306 may be initialized before the beginning of each timeslot. After initialization, the uplink digest data 304, the grant data 166, or a combination thereof, may be used to determine the uplink status data 306. For example, the uplink status data 306 may comprise values that are initially provided by the uplink digest data 304. As time progresses, some UTs 108 may not use the resources allocated by their respective grant data 166, and so actual uplink status data 306 may vary during the course of a timeslot. For example, UT 108(3192) may not send upstream data 112. With no data sent by the UT 108(3192) on the uplink, no receipt ack 302 is transmitted by the satellite 102. The first UT 108(1) may detect this discrepancy and update the uplink status data 306 to indicate that the actual uplink capacity is less than expected, due to UT 108(3192) not sending upstream data 112.

Figure 6:
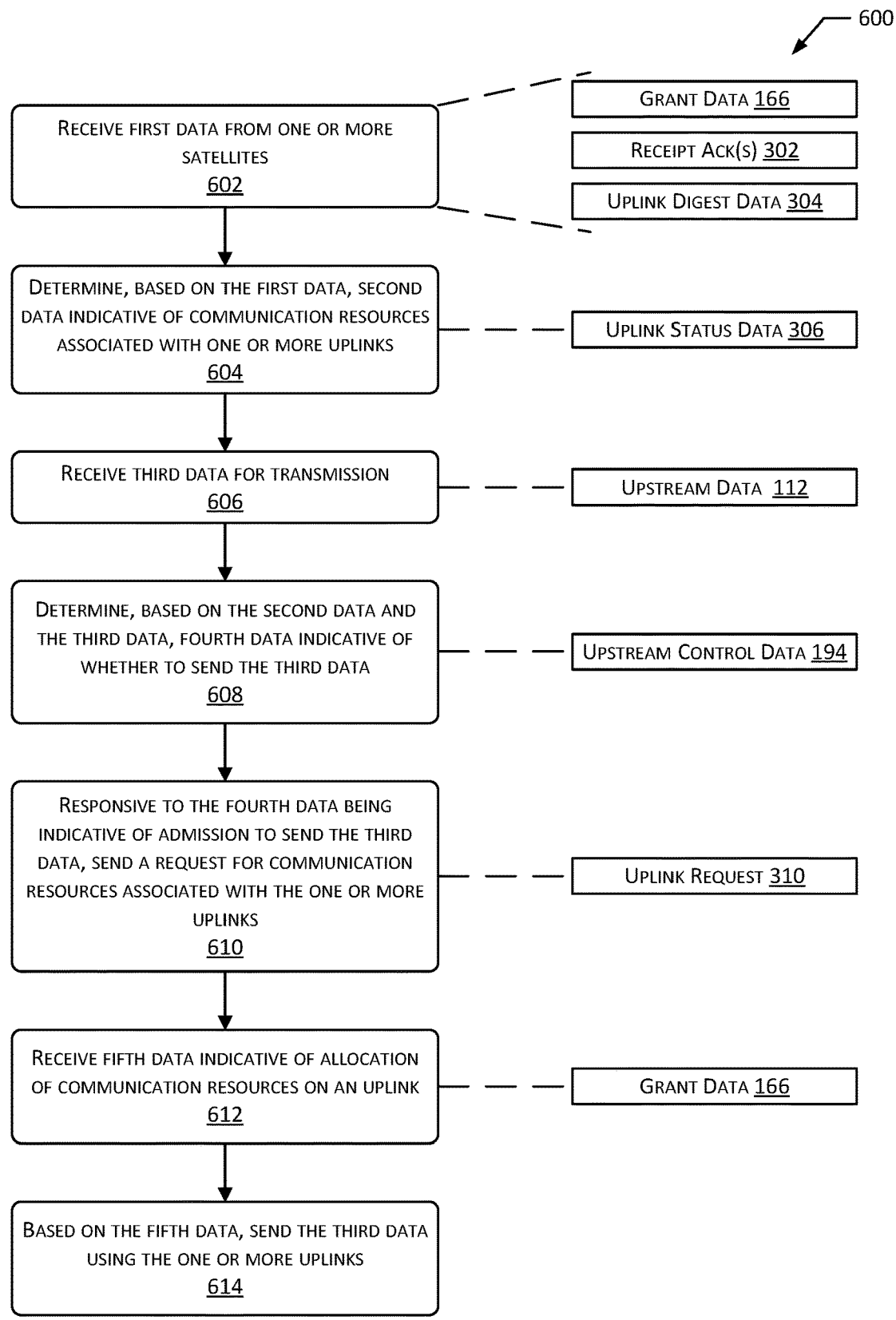
FIG. 6 is a flow diagram of a process of distributed uplink management that may be performed by individual user terminals, according to some implementations.

FIG. 6 is a flow diagram 600 of a process of distributed uplink management, according to some implementations. The process may be performed by individual UTs 108. For example, the distributed uplink management system 192 may implement the process. In this illustration, time generally increases from top to bottom. For example, an operation depicted at the top of the page may occur before an operation depicted at the bottom of the page.

At 602, first data is received at a first time from one or more satellites 102 using a first network interface. For example, the first UT 108(1) may use the communication system 180 to receive one or more of grant data 166, receipt acks 302, uplink digest data 304, and so forth. The first data may or may not be specifically addressed to the UT 108. For example, the first data may be broadcast by the satellite 102 to all UTs 108 that are in range. In another example, the first data may have a destination address that is associated with another UT 108.

At 604, based on the first data, second data is determined that is indicative of communication resources associated with one or more uplinks at a second time. For example, the distributed uplink management system 192 may process the grant data 166 that is associated with an upcoming timeslot and may determine the uplink status data 306. In another example, the grant data 166 and the uplink digest data 304 may be used to determine the uplink status data 306. In yet another example, the uplink digest data 304 may be used to determine the uplink status data 306. The second data may be indicative of one or more of: actual data throughput of the uplink before the first time, estimated data throughput of the uplink on or after the second time, a count of grants scheduled to use the uplink on or after the second time, a quantity of data associated with an individual grant to use the uplink, and so forth.

At 606 third data is received, using a second network interface, for transmission to the satellite 102 using the first network interface. For example, the application module 188 executing on a user device 110 may generate upstream data 112. The upstream data 112 may be received by the UT 108 with a local area network interface.

Information contained within the upstream data 112 may be used to determine the upstream control data 194. The upstream data 112 may comprise one or more of header data or payload data. For example, packets compliant with Internet Protocol (IP) may include a packet fixed header, a packet extension header, a packet payload, and so forth. For example, the packet fixed header may comprise version data, traffic class data, flow label data, source address, destination address, and so forth. In another example, the packet extension header may comprise routing data, fragmentation data, authentication data, encapsulating security data, destination option data, host identity protocol data, and so forth.

One or more of the packet fixed header or the packet extension header may be implemented consistent with the Internet Protocol Version 6 (IPv6) specification promulgated by the Internet Engineering Task Force (IETF). (See Deering, S., "Internet Protocol, Version 6 (IPv6) Specification", RFC 8200, DOI 10.17487/RFC8200, July 2017, www.rfc-editor.org/info/rfc8200.) For example, the version data indicates the version of internet protocol in use. The traffic class data indicates the class of data for use in differentiated services and explicit congestion notification. The flow label may comprise data provided by a source of the upstream data 112 to label sequences of packets that are to be treated as a single flow. The source address is indicative of the source of the upstream data 112. The destination address is indicative of the destination address to which the upstream data 112 is to be delivered. The routing data is indicative of one or more intermediate network nodes that were used to transfer the packet. The fragment data is data that is used by a source of the upstream data 112 to indicate that data having a bit size larger than would otherwise fit within a single message transfer unit to the destination has been fragmented across several packets. The authentication header data and encapsulating security data are indicative of authentication and encapsulation associated with the upstream data 112. (See Kent, S., "IP Authentication Header", RFC 4302, DOI 10.17487/RFC4302, December 2005, www.rfc-editor.org/info/rfc4302.) The destination option data may comprise optional information to be examined by a destination node. The host identity protocol data may comprise data such as digital certificates to implement a host identity name space. (See Moskowitz, Ed., "Host Identity Protocol Version 2 (HIPv2)", RFC 7401, DOI 10.17487/RFC7401, April 2015, www.rfc-editor/info/rfc7401.)

A service may be specified based on a destination address, port number, other data in the header, payload data, and so forth. For example, the traffic class data may be used to indicate that the packet contains latency-sensitive data such as telephony data.

Information about how the third data is being provided to the UT 108 may be determined. Data indicative of a rate at which the upstream data 112 is received from the user device 110 may be determined. For example, a rate indicative of a number of bits per second of upstream data 112 received from the user device 110 may be determined. In another example a total size of the third data may be determined. Continuing the example, the user device 110 may send a set of packets that are part of a sequence. The total size of the third data may comprise the sum of the size of all the packets in the sequence.

At 608 based on the second data and the third data, fourth data is determined that is indicative of whether to send the third data to the satellite 102. For example, the distributed uplink management system 192 may use the uplink status data 306 and the upstream data 112 to determine the upstream control data 194.

The distributed uplink management system 192 may implement an optimization function as described in the following equation:

$$\tilde{D}(n) = \arg\max\nolimits_{A(u_i)} f(S(n-M), \ldots, S(n)), \text{ subject to } Br^s, U_g^s \quad \text{(Equation 1)}$$

where:

D is the upstream control data 194 that is indicative of approving or denying upstream data 112, n is a scheduling instance or interval, such as a next available timeslot, $S = [S_1, S_2, S_3, S_4]$, further wherein $S_1$ is the number of upstream queues 196, $S_2$ is the size of the upstream queues 196, $S_3$ is grant size associated with the grant data 166, $S_4$ is the average uplink throughput, M specifies a number of factors to be considered, Br is satellite broadcast information, such as the uplink digest data 304

$U_g$ is a grant specified by the grant data 166

While D may be expressed as a binary value, to approve or deny upstream data 112, in other implementations D may be expressed as a probability or other value. For example, the distributed uplink management system 192 may determine a probability that the upstream data 112 will be able to be sent to the satellite 102. If the probability is less than a threshold value, the upstream data 112 may be denied. If the probability is greater than the threshold value, the upstream data 112 may be enqueued within the upstream queue 196 to be sent. The threshold value may be static or dynamically determined. For example, the threshold value may be set to 0.7 based on a test of the system 110.

At 610, responsive to the fourth data being indicative of admission to send the third data, the UT 108 sends an uplink request 310 to the satellite 102. For example, the upstream data 112 may be stored in the upstream queue 196. Based on a quantity of upstream data 112 stored in the upstream queue 196, the UT 108 may generate an uplink request 310 to request uplink resources sufficient to send that quantity of data. The uplink request 310 may be sent to the satellite 102 using the communication system 180.

At 612 the UT 108 receives fifth data indicative of allocation of communication resources on an uplink. For example, the UT 108 receives grant data 166 that provides the UT 108 with information such as timeslot, uplink frequency, and so forth to use in sending the upstream data 112.

At 614, based on the fifth data, the third data is sent using the one or more uplinks. For example, using the parameters 502 specified by the grant data 166, the UT 108 sends the upstream data 112 stored in the upstream queue 196 to the satellite 102 using the communication system 180.

In some implementations, the distributed uplink management system 192 may select an uplink for use that differs from one that is currently associated with the UT 108. For example, if a first uplink of the first satellite 102(1) is overburdened, and a second uplink of the second satellite 102(2) that is in range is underutilized, the distributed uplink management system 192 may send an uplink request 310 to the second satellite 102(2). This may or may not affect the delivery of downstream data 142. For example, the first UT 108(1) may continue to receive downstream data 142 from the first satellite 102(1) while sending upstream data 112 using the second satellite 102(2).

In some implementations operations 610-614 may be omitted. For example, based on the upstream control data 194 being indicative of admission to send the upstream data 112 using the first network interface, the third data may be sent using the first network interface.

The distributed uplink management system 192 may utilize a trained machine learning algorithm to determine the upstream control data 194. For example, a neural network or classifier may be trained, using training data, to determine the upstream control data 194. The training data may comprise data that is indicative of communication resources associated with usage of the uplink during a first interval and upstream data 112 that was previously sent. For example, the training data may comprise one or more of the grant data 166, receipt acks 302, uplink digest data 304, and so forth that is associated with upstream data 112 that was actually sent to a satellite 102 using the first network interface. In this way, the trained machine learning algorithm learns to associate conditions of the uplink with successful sending of the upstream data 112. The training data may then be used to train the machine learning algorithm. In one implementation the UT 108 may perform the training process of the machine learning algorithm. In another implementation, the training of the machine learning algorithm may be performed by another device. For example, the ground station 106, the PoP system 146, the management system 150, or other devices may perform the training process. The trained machine learning algorithm, such as data indicative of one or more weight values within a neural network, may then be sent to the UT 108. For example, the weight values or other values of the trained neural network that are representative of the now-trained neural network may be sent to the UT 108.

In some implementations the machine learning algorithm may be trained for a particular UT 108. For example, the training data may be based on data received by the first UT 108(1). In another implementation the machine learning algorithm may be trained for a particular group of UTs 108, such as a set of UTs 108 that are within a common service area, serviced by a common subbeam, and so forth. In this implementation, the particular behaviors and patterns of upstream data 112 that are associated with that particular group may be accounted for. For example, the training data may include information such as UT identifiers indicated in the grant data 166, to allow the distributed uplink management system 192 respond to the operation of other UTs 108. Continuing the example, the machine learning algorithm may be responsive to conditions such as grant data 166 being sent to UT 108(9438) typically results in uplink capacity subsequently decreasing as UT 108(9438) is given priority access.

In another implementation a regression model may be used to determine the upstream control data 194. For example, a regression analysis may be performed using training data, and the results of the regression analysis may be used to assess subsequent data.

In some implementations, portions of the process may be conditionally omitted. For example, after 604 the uplink status data 306 indicates that the available uplink resources are insufficient to send the data currently enqueued in one or more upstream queues 196, the process may wait until a next uplink interval, and return to 602.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first user terminal (UT) comprising:
a first network interface;
a second network interface; and
one or more first processors executing first instructions to:
receive, at a first time, first data from a first satellite using the first network interface;
determine, based on the first data, second data indicative of communication resources associated with an uplink to the first satellite at a second time;
receive, at a third time, third data from a first device using the second network interface;
determine, based on the second data and the third data, fourth data that is indicative of approval to transmit the third data to the first satellite using the first network interface;
send a request to the first satellite for allocation of the communication resources;
receive, from the first satellite, fifth data indicative of the allocation of the communication resources; and
send, based on the fifth data, the third data to the first satellite.

2. The system of claim 1, the one or more first processors further executing the first instructions to:
send sixth data to the first device, wherein the sixth data is indicative of the approval to transmit the third data to the first satellite.

3. The system of claim 1, the one or more first processors further executing the first instructions to:
receive, at a fourth time, sixth data from a second device using the second network interface; and
determine, based on the second data and the sixth data, that the sixth data is not sent to the first satellite.

4. The system of claim 1, wherein the second data is indicative of one or more of:
actual data throughput of the uplink before the first time,
estimated data throughput of the uplink on or after the second time,
a count of grants scheduled to use the uplink on or after the second time, or
a quantity of data associated with an individual grant to use the uplink.

5. The system of claim 1, wherein the fourth data is further based on one or more of:
a source address of the third data,
a destination address of the third data,
quality of service data associated with the third data,
a rate at which the third data is received from the first device, or
a total size of the third data.

6. The system of claim 1, the one or more first processors further executing the first instructions to:
determine, based on sixth data received from the first satellite during a first interval that ends before the first time, seventh data indicative of the communication resources associated with usage of the uplink to the first satellite during the first interval;
receive, during the first interval, eighth data from the first device;
send, during the first interval, at least a portion of the eighth data to the first satellite;
determine training data comprising:
at least a portion of the seventh data; and
at least a portion of the eighth data;
train a machine learning algorithm using the training data; and wherein the first instructions to determine the fourth data use the trained machine learning algorithm.

7. The system of claim 1, further comprising:
a first computing system comprising:
a third network interface;
one or more second processors executing second instructions to:
receive, from the first satellite using the third network interface, sixth data indicative of the communication resources associated with actual usage of the uplink to the first satellite by a plurality of UTs during a first interval;
train a machine learning algorithm based on at least a portion of the sixth data;
send seventh data to the first UT using the third network interface, wherein the seventh data is representative of one or more weights of the trained machine learning algorithm; and
wherein the first instructions to determine the fourth data use the trained machine learning algorithm received from the first computing system.

8. A method comprising:
receiving, at a first time, first data from a first satellite using a first network interface;
determining, based on the first data, second data indicative of communication resources associated with an uplink to the first satellite at a second time;
receiving, at a third time, third data from a first device using a second network interface;
determining, based on the second data and the third data, fourth data that indicates approval to transmit the third data to the first satellite;
sending a request to the first satellite for allocation of the communication resources; and
receiving, from the first satellite, fifth data indicative of the allocation of the communication resources.

9. The method of claim 8, further comprising:
sending, based on the fifth data, the third data to the first satellite using the first network interface.

10. The method of claim 8, further comprising:
sending sixth data to the first device using the second network interface, the sixth data indicative of the approval of to transmit the third data to the first satellite.

11. The method of claim 8, wherein the second data is indicative of one or more of:
actual data throughput of the uplink before the first time,
estimated data throughput of the uplink on or after the second time,
a count of grants sent by the first satellite on or after the second time, wherein each grant allocates at least a portion of the communication resources associated with use of the uplink, or
a quantity of data allocated by a grant to use the uplink.

12. The method of claim 8, wherein the fourth data is further based on one or more of:
a source address of the third data,
a destination address of the third data,
quality of service data associated with the third data,
a rate at which the third data is received from the first device, or
a total size of the third data.

13. The method of claim 8, further comprising:
receiving sixth data from the first satellite during a first interval that ends before the first time;
determining, based on the sixth data, seventh data indicative of the communication resources associated with usage of the uplink to the first satellite during the first interval;
receiving, during the first interval, eighth data from the first device;
sending, during the first interval, at least a portion of the eighth data to the first satellite;
determining training data comprising:
at least a portion of the seventh data; and
at least a portion of the eighth data;
training a machine learning algorithm using the training data; and
wherein the determining the fourth data uses the trained machine learning algorithm.

14. A system comprising:
a first user terminal (UT) comprising:
a first network interface;
a second network interface; and
one or more first processors executing first instructions to:
receive, using the first network interface, first data from a first satellite, wherein the first data is indicative of communication resources associated with an uplink to the first satellite that is in use by a plurality of UTs, and wherein the plurality of UTs includes the first UT;
receive, using the second network interface, second data from a first device;
determine, based on the first data and the second data, third data that is indicative of approval to transmit the second data to the first satellite; and
send a request to the first satellite for allocation of the communication resources, based on the third data.

15. The system of claim 14, the one or more first processors further executing the first instructions to:
receive, from the first satellite, fourth data indicative of the allocation of the communication resources; and
send, based on the fourth data, the second data using the first network interface.

16. The system of claim 14, the one or more first processors further executing the first instructions to:
send the second data using the first network interface.

17. The system of claim 14, wherein the first data is indicative of one or more of:
actual data throughput of the uplink before a first time,
estimated data throughput of the uplink on or after a second time,
a count of grants scheduled to use the uplink on or after the second time, wherein each grant allocates at least a portion of the communication resources associated with the uplink on or after the second time, or
a quantity of data associated with an individual grant to use the uplink.

18. The system of claim 14, wherein the third data is further based on one or more of:
a source address of the second data,
a destination address of the second data,
quality of service data associated with the second data,
a rate at which the second data is received from the first device, or
a total size of the second data.

19. The system of claim 14, the one or more first processors further executing the first instructions to:

receive, using the first network interface and during a first interval, fourth data indicative of the communication resources associated with the uplink to a second satellite that is in use by the plurality of UTs;

receive, using the second network interface and during the first interval, fifth data;

send, using the first network interface and during the first interval, at least a portion of the fifth data to the second satellite;

determine training data comprising:
 at least a portion of the fourth data; and
 at least a portion of the fifth data;

train a machine learning algorithm using the training data; and wherein the first instructions to determine the third data use the trained machine learning algorithm.

20. The system of claim 14, further comprising:
a first computing system comprising:
 a third network interface;
 one or more second processors executing second instructions to:
  determine a first set of satellites that are associated with providing one or more uplinks to the plurality of UTs during a first interval;
  receive, from the first set of satellites, fourth data indicative of the communication resources associated with actual usage of the one or more uplinks during the first interval;
  train a machine learning algorithm based on at least a portion of the fourth data;
  send, using the third network interface, fifth data to the first UT, wherein the fifth data is representative of the trained machine learning algorithm; and
 wherein the first instructions to determine the third data use the trained machine learning algorithm received from the first computing system.

* * * * *

UNITED STATES PATENT AND TRADEMARK OFFICE
CERTIFICATE OF CORRECTION

| | |
|---|---|
| PATENT NO. | : 11,368,213 B1 |
| APPLICATION NO. | : 17/063926 |
| DATED | : June 21, 2022 |
| INVENTOR(S) | : Baosheng Li et al. |

It is certified that error appears in the above-identified patent and that said Letters Patent is hereby corrected as shown below:

In the Claims

Column 25, Claim 10, Line 43:
Currently reads "approval of to transmit the third data"
Where it should read --approval to transmit the third data--.

Signed and Sealed this
Sixteenth Day of August, 2022

Katherine Kelly Vidal
*Director of the United States Patent and Trademark Office*